United States Patent
Al-Negheimish et al.

(10) Patent No.: US 8,071,010 B2
(45) Date of Patent: Dec. 6, 2011

(54) PROCESS FOR PRODUCING CONCRETE IN HOT WEATHER

(75) Inventors: Abdulaziz I. Al-Negheimish, Riyadh (SA); Abdulrahman M. Alhozaimy, Riyadh (SA); Rajeh Z. Al-Zaid, Riyadh (SA)

(73) Assignee: King Saud University, Riyadh (SA)

( * ) Notice: Subject to any disclaimer, the term of this patent is extended or adjusted under 35 U.S.C. 154(b) by 479 days.

(21) Appl. No.: 12/191,692

(22) Filed: Aug. 14, 2008

(65) Prior Publication Data

US 2010/0037802 A1 Feb. 18, 2010

(51) Int. Cl.
*B28B 3/00* (2006.01)
(52) U.S. Cl. .................. 264/333; 264/DIG. 43; 106/713
(58) Field of Classification Search .................. 106/713, 106/724, 823; 264/333, DIG. 43
See application file for complete search history.

(56) References Cited

U.S. PATENT DOCUMENTS 3,666,502 A * 5/1972 Lombardo .................. 106/31.4

* cited by examiner

*Primary Examiner* — Paul Marcantoni
(74) *Attorney, Agent, or Firm* — Lowe Hauptman Ham & Berner, LLP

(57) ABSTRACT

A process for manufacturing concrete bodies at elevated temperatures including the steps of providing pre-selected amounts of cement, aggregate and water where the temperature of at least the aggregate and more likely the cement and water are heated to a temperature between about 32° C. and 45° C. The heated amounts of cement, aggregate and water are mixed at an elevated temperature within the aforementioned range and a set retarding, water reducing admixture added. The mixing is continued and the hot mixture including the set retarding, water reducing admixture is cast at an elevated temperature within the same range to provide a concrete body form or structure with improved short and long-term compressive strengths.

5 Claims, 4 Drawing Sheets

PROCESS FOR PRODUCING CONCRETE IN HOT WEATHER

FIELD OF THE INVENTION

This invention relates to a process for producing concrete in hot weather to provide improved short and long term compressive strengths.

BACKGROUND FOR THE INVENTION

It has been recognized that hot weather can cause problems in working with concrete and that such problems increase as temperatures rise. For example, it has been reported that it may be necessary to make adjustments to a concrete mix as the weather warms because an everyday mix can begin to perform differently as temperatures rise above about 23° C. (75° F.). It has also been recognized that hot weather is a combination of the following weather conditions: High ambient temperature; High concrete temperature; Low relative humidity; Solar radiation; and High wind speed.

In the Middle East and some parts of the United States, ambient temperatures of about 32° to 45° C. are frequently encountered during summer months. For example, in 1913 in Death Valley, Calif. a temperature of 134° F. (56.6° C.) was recorded. Problems associated with extreme heat i.e. 32° C. (90°) to 40 or 45° C. (104-113° F.) or greater include increased water demand, increased rate of slump loss, increased rate of setting, increased tendency for plastic-shrinkage cracking and increased difficulty in controlling entrained air content.

The main problem affecting hardened concrete is the decreased long-term strength.

Authorities in concrete technology such as individuals in the American Concrete Institute (ACI) and Portland Cement Association (PCA) recommend cooling concrete as low as possible in order to obtain good quality concrete in hot weather. In addition, some specifications require that when placed, concrete should have a temperature of less than 29° C. (84° F.) to 32° C. (90° F.). Therefore, in areas of extreme temperature, ice or chilled water is added to a hydraulic cement, aggregate and water mix. Further, in adding ice, it is important to use crushed, shaved or chipped ice to ensure all of the ice melts before mixing is completed. Reducing temperatures of a concrete mix adds substantially to the cost of the process.

Set retarding/water-reducing admixtures are sometimes used to counteract many of the negative impacts of hot weather on fresh concrete, particularly the rapid setting caused by high temperatures. Water-reducing admixtures can help curb slump loss without affecting the water demand of the mix. However, chemical admixtures are conditional on cement type and require care in adjusting dosage. Admixtures that increase the bleeding rate can help counteract surface drying, but may also require additional consolidation after the majority of bleeding has subsided.

BRIEF SUMMARY OF THE INVENTION

In essence, the present invention contemplates a process for manufacturing concrete form structures or the like for pre-cast plants and ready-mixed concrete (RMC) products at elevated temperatures while providing improved short term and long term strengths. The process includes the steps of providing masses i.e. pre-selected amounts of hydraulic cement, aggregate and water and heating or allowing the aggregate and water to come to an elevated temperature of about 32° C. to about 45° C. The cement, heated aggregate and water are then mixed while maintaining the temperature within the range of 32° to 45° C. to form a heated mixture with a temperature within the aforementioned range. The process also includes the steps of selecting a set retarding/water reducing admixture conforming to ASTM C494 Type D and adding a pre-selected amount of the pre-selected admixture to the heated mixture with continued mixing. The heated mixture with admixture are then cast to provide a concrete form with improved strength.

The invention also contemplates a concrete form made by the above-identified process.

The invention will now be described in connection with the following drawings.

The compressive strength in the above-mentioned figures is measured using standard cube specimens.

DESCRIPTION OF THE PREFERRED EMBODIMENTS OF THE INVENTION

Figure 1:
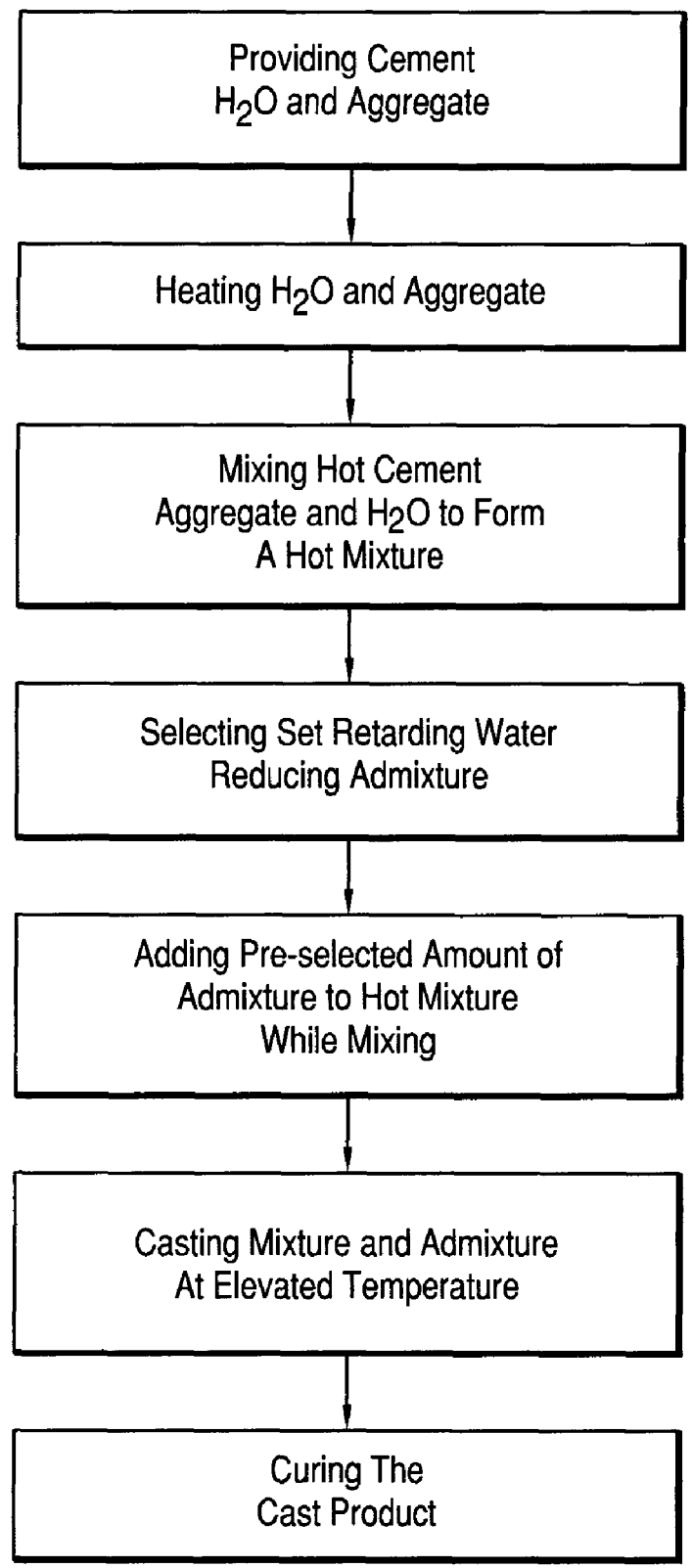
FIG. 1 is a flow chart illustrating a method in accordance with a first embodiment of the invention.

A process for manufacturing concrete forms, bodies and or structures at elevated temperatures will now be described in connection with FIG. 1. The process or method is applicable to areas of extreme heat wherein temperatures of 32° C. (90° F.) to 45° C. (113° F.) are commonly encountered during the summer months of May-September. The process includes the step 22 of providing pre-selected amounts of cement, a mass of aggregate and an amount of water. In most cases, the cement and aggregate are stored at ambient temperatures and in some areas even the water is stored at ambient temperatures so that the temperatures are frequently above 32° C. (90° F.). Therefore, the process includes the step 24 of heating of water and aggregate to a temperature of between about 32° to 45° C.

Cement and the heated water and aggregate are mixed together in step 26 in a conventional manner to form a hot mixture at an elevated temperature, as for example above 32° C. (90° F.). A set retarding water reducing admixture is selected in step 28 and added to the hot mixture in step 30 in an amount of between about 200 to 900 milliliters per 100 kg of mass of cement. In a preferred embodiment of the invention the set retarding and water reducing admixture is selected from the group consisting of ASTM C 494 Type D.

The hot mix is then cast in step 32 at an elevated temperature of between 32° C. (90° F.) and 45° C. (113° F.) to provide a concrete body with improved short term and long term compressive strength.

The inventors conducted several studies on the effects of high concrete temperature at the time of placing on the strength of concrete incorporating many types of chemical admixtures. In one of the studies, two brands of chemical admixtures conforming to ASTM C494 Type D and cement of Type I and Type V were used. Three casting temperatures (24, 32 and 40° C.) were investigated. The temperatures of concrete at the time of placing of 24, 32 and 40° C. were selected to cover laboratory (ideal), typical maximum specified concrete temperature and the common concrete temperature encountered during the production of RMC during summer time, respectively. After casting, specimens were stored in the laboratory environment for the first 24 hours followed by moist curing under standard conditions until the age of testing.

Compressive strength of concrete was measured at 3, 7, 28, 91 and 365 days. For selected mixes, the temperature of concrete was monitored continuously for about 21 hrs. after casting using thermocouples embedded in concrete cube at about mid-depth during the time of casting.

Two brands of commercially available admixtures typical of those used by the ready-mixed concrete industry in the Middle East and referred to subsequently as Brand A and Brand B were used in this study. Both brands conformed to ASTM Type B—retarding admixtures and Type D-water reducing and retarding admixtures. The chemical composition of Brand A was according to the manufacturer an aqueous solution of lignosulphonates organic polymer. Brand B was marketed by a different manufacturer which gave the composition as high molecular weight refined lignosulphonates and synthetic retarders.

The manufacturer's recommended dosage for each brand was used for relevant mixes irrespective of the initial concrete temperature. For Brand A, the dosage was 0.6 liters per 100 kg of cement and for Brand B, the dosage was 0.4 liters per 100 kg of cement for both types of cement.

To isolate the effect of initial concrete temperature on the compressive strength, the water to cement ratio (w/c) was fixed to 0.5 for all mixes regardless of casting temperature, cement type and admixture brand and no adjustments were made to the concrete mixes to offset the change in workability at high casting temperature. Concrete temperatures were recorded during the first 24 hrs after casting for some concrete specimens to see the influence of initial concrete temperature and the use of chemical admixtures on the temperature profile during the hardening stage.

Figure 2:
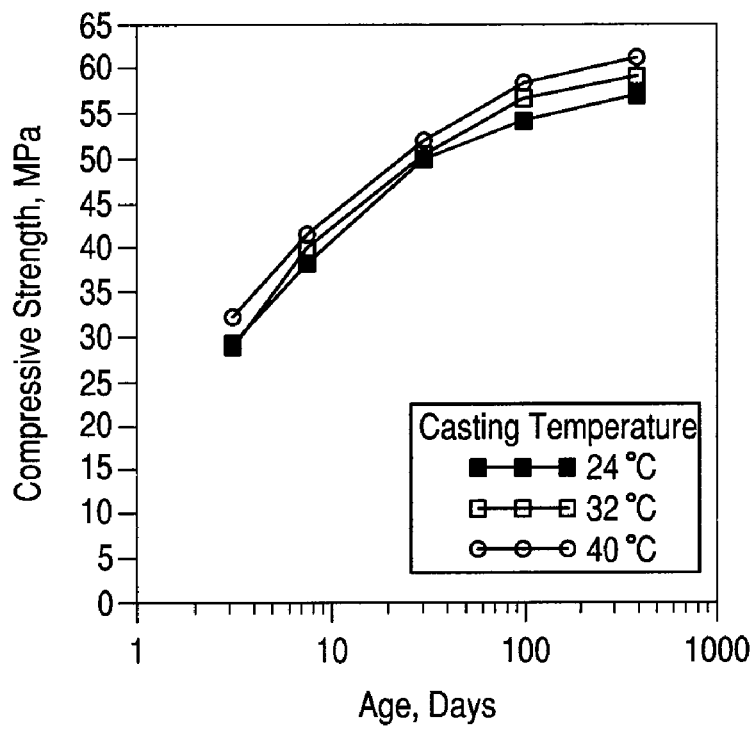
FIG. 2 is a graph showing the compressive strength development of three concrete bodies at the indicated temperatures wherein one of the bodies is formed by a conventional method and two are formed by methods in accordance with the present invention and wherein each of the bodies include a first retarder.
Figure 3:
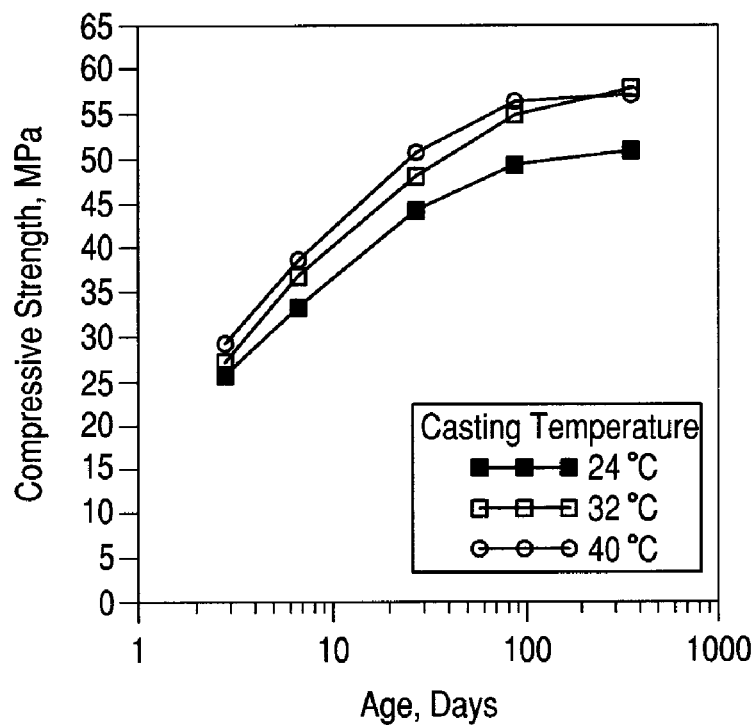
FIG. 3 is a graph showing the compressive strength development of three concrete bodies at the indicated temperatures wherein one of the bodies is formed by a conventional method and two are formed by methods in accordance with the present invention and wherein each of the bodies include a second retarder.
Figure 4:
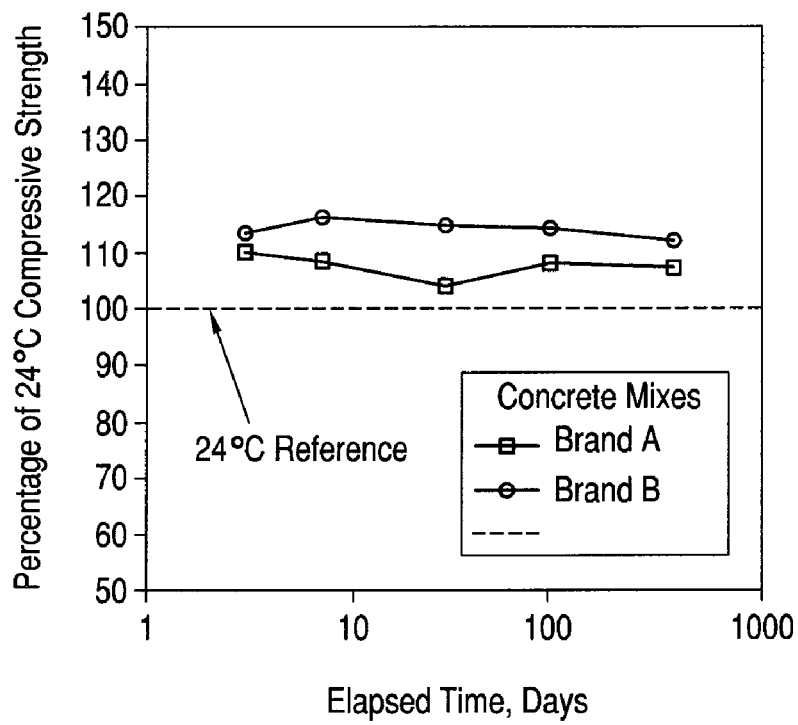
FIG. 4 is a graphical illustration showing the impact of increasing concrete temperatures from 24° C. to 40° C. on the compressive strength of concrete made with Type I cement.

The results of this investigation showed a clear benefit of using chemical admixtures conforming to ASTM C-494, Type B and Type D on the compressive strength of concrete at high placing temperature as can be seen from FIGS. 2 and 3 for Brand A and Brand B, respectively. The use of these chemical admixtures resulted in a substantial increase of the compressive strength at both early and later ages when concrete temperature at the time of placing was increased from 24 to 40° C. as shown in FIG. 4.

Figure 5:
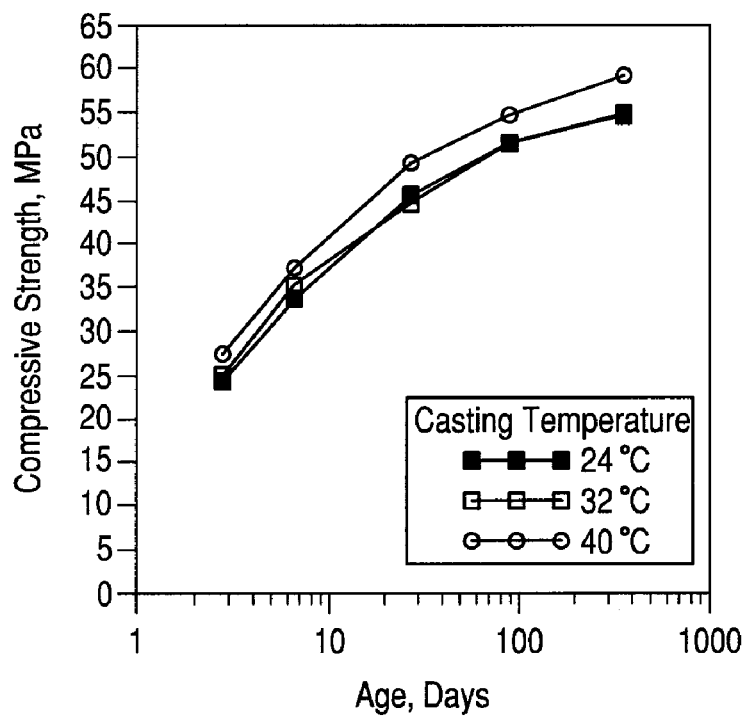
FIG. 5 illustrates the compressive strength development of concrete cast at the temperatures indicated and cured under laboratory conditions (Type-V cement with Brand A)

The performance of concrete mixes made with Type V cement under the various casting conditions shown in FIG. 5 was comparable to those made with Type I cement indicating no major effect of the type of cement on the interaction of temperature and strength development of concrete with these types of admixtures.

Figure 6:
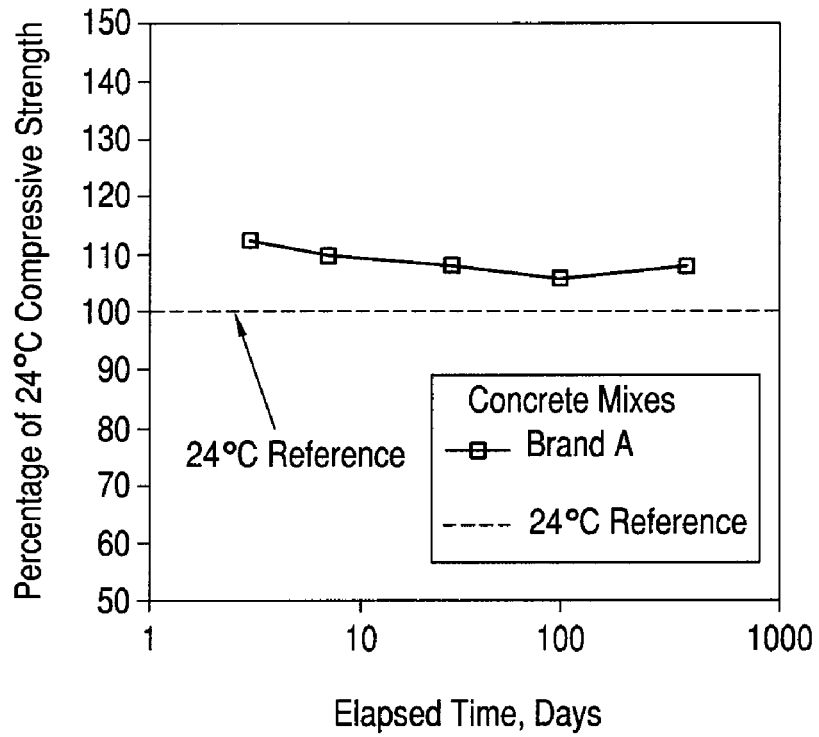
FIG. 6 illustrates the impact of increasing concrete temperatures from 24° C. to 40° C. on the compressive strength of concrete made with Type-V cement.
Figure 7:
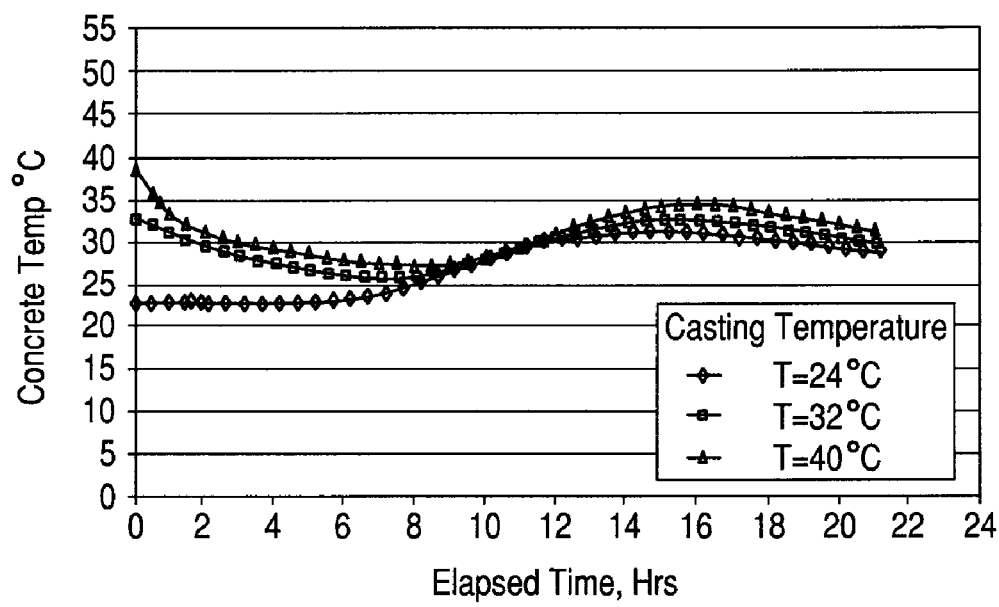
FIG. 7 is a temperature profile of concrete cast at the temperature indicated and placed in the laboratory environment (Type-I cement with Brand A).

Comparisons of temperature records for concrete mixes with different initial temperature and subsequently stored in the same laboratory environment are shown in FIG. 7. The figure shows the temperature of both 40° C. and 32° C. mixes to decrease over time reaching 26° C. after 8 hrs with 24° C. mix remaining almost constant over the same period. Afterwards, all three mixes start showing gradual temperature rise due to the restart (resumption) of the hydration process. The peak temperature for the three mixes was reached at almost the same time (15 hrs after casting) and varied only by few degrees. The effect of the use of these types of admixtures is manifested by the delay in the start of hydration and the time to reach peak temperature. The observed strength improvement shown in FIGS. 1 through 5 for 40° C. mix over those of 24° C. mix is an indication of a positive interaction between the admixture and cement at high casting temperature. The temperature profiles of specimens depicted in FIG. 6 clearly show this positive interaction to be taken place early in the hydration process since the temperatures of the three mixes were almost identical during the hardening stage (after 8 hrs of casting). It is believed that the compressive strength of concrete with high casting temperatures even at later ages indicate that high initial concrete temperature has a positive impact on the microstructure of concrete.

While the invention has been described in connection with its preferred embodiments, changes and modifications may be made therein without departing from the scope of the appended claims.

What is claimed is:

1. A process for manufacturing concrete forms at elevated temperatures to improve strength comprising:
   mixing hydraulic cement, aggregate, and water;
   heating the mixture of hydraulic cement, aggregate, and water mixture to a temperature of about 32° C. to about 45° C.;
   adding a set retarding water reducing admixture conforming to ASTM C 494 and mixing into the mixture;
   casting the mixture with the admixture at an elevated temperature of between 32° C. and 45° C. to provide a product; and
   curing the cast concrete product into a form or shape.

2. A concrete form manufactured by a process comprising:
   mixing hydraulic cement, aggregate, and water;
   heating the mixture of hydraulic cement, aggregate, and water mixture to a temperature of about 32° C. to about 45° C.;
   adding a set retarding water reducing admixture conforming to ASTM C 494 and mixing into the mixture;
   casting the mixture with the admixture at an elevated temperature of between 32° C. and 45° C. to provide a product; and
   curing the cast concrete product into a form or shape.

3. A process for manufacturing concrete forms according to claim 1 in which the admixture is an ASTM C 494 Type D.

4. A process for manufacturing concrete forms according to claim 1 in which the admixture is an ASTM C 494 Type D and adding to the mixture in an amount ranging from about 200-900 milliliters per 100 kg of mass of cement.

5. A process for manufacturing a concrete form according to claim 1 in which the cement is Portland cement.

* * * * *